(12) United States Patent
Classen et al.

(10) Patent No.: US 7,730,783 B2
(45) Date of Patent: Jun. 8, 2010

(54) ACCELERATION SENSOR

(75) Inventors: Johannes Classen, Reutlingen (DE);
Markus Heitz, Kusterdingen (DE); Lars Tebje, Reutlingen (DE); Fouad Bennini, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 73 days.

(21) Appl. No.: 11/985,254

(22) Filed: Nov. 13, 2007

(65) Prior Publication Data

US 2008/0141774 A1   Jun. 19, 2008

(30) Foreign Application Priority Data

Nov. 13, 2006   (DE) .................. 10 2006 053 290

(51) Int. Cl.
*G01P 15/00* (2006.01)
(52) U.S. Cl. .................. 73/514.38; 73/514.32
(58) Field of Classification Search ............ 73/514.01, 73/514.32, 514.38, 514.29
See application file for complete search history.

(56) References Cited

U.S. PATENT DOCUMENTS

| | | | | |
|---|---|---|---|---|
| 5,415,043 | A * | 5/1995 | Zabler et al. ............. | 73/514.38 |
| 6,923,062 | B2 * | 8/2005 | Franz et al. .............. | 73/514.38 |
| 2002/0011112 | A1 * | 1/2002 | Kipp et al. .................... | 73/579 |
| 2004/0025589 | A1 * | 2/2004 | Kurle et al. ................... | 73/488 |
| 2004/0129077 | A1 * | 7/2004 | Franz et al. .............. | 73/514.14 |
| 2007/0126069 | A1 * | 6/2007 | Muchow et al. ............. | 257/414 |

* cited by examiner

*Primary Examiner*—Daniel S Larkin
*Assistant Examiner*—Samir M Shah
(74) *Attorney, Agent, or Firm*—Kenyon & Kenyon LLP

(57) ABSTRACT

An acceleration sensor includes a seismic mass which is suspended on springs above a substrate and is deflectable in a direction perpendicular to a surface of the substrate. In order to reduce deflections of the seismic mass along the surface of the substrate because of interference accelerations, which lead to a falsification of the measurements of the deflection of the seismic mass perpendicular to the surface of the substrate, the springs include two bending bars which are interconnected via crosspieces.

14 Claims, 5 Drawing Sheets

ACCELERATION SENSOR

BACKGROUND INFORMATION

An acceleration sensor includes a seismic mass which is suspended on springs above a substrate, and is deflectable in a direction perpendicular to a surface of the substrate.

The deflection of the seismic mass in a direction perpendicular to the substrate because of an acceleration is detected by an electrode provided below the seismic mass on the substrate. Due to interference accelerations, the seismic mass is able to be deflected not only in a direction perpendicular to the surface of the substrate, but also along the surface of the substrate. Because of inaccuracies when manufacturing the springs, an interference acceleration along the surface of the substrate can also lead to a deflection perpendicular to the substrate surface, the measurement of the acceleration perpendicular to the surface of the substrate thereby being falsified. Especially because of vibrations, the seismic mass of the acceleration sensor can be induced to oscillate with a natural frequency along the surface of the substrate, these oscillations then falsifying the measurement of the acceleration perpendicular to the surface of the substrate. In this context, the natural frequency of the oscillations along the surface of the substrate is a function of the stiffness of the springs along the surface of the substrate.

In each case, the springs are made of an elongated, flexible element. The stiffness of the springs along the surface of the substrate can be increased by enlarging the cross-section of the flexible elements. However, the stiffness of the springs perpendicular to the surface of the substrate thereby increases at the same time. The sensitivity of the acceleration sensor to deflections in the z-direction decreases correspondingly.

SUMMARY OF THE INVENTION

An object of the present invention is to provide a sensitive acceleration sensor which is set up to measure accelerations in one direction, and whose measurements are scarcely falsified by interference accelerations perpendicular to the direction.

According to the present invention, each spring includes two bending bars that are interconnected via crosspieces.

Advantageously, such a spring exhibits great stiffness in a direction along the surface of the substrate.

In one preferred specific embodiment, each of the two bending bars has a constant width.

In a further refinement of the preferred specific embodiment, the crosspieces have a constant length, so that the two bending bars run parallel to each other.

In a further preferred specific embodiment, the crosspieces are set apart uniformly between the bending bars.

Advantageously, the stiffness of the springs may thereby be maximized in a direction along the surface of the substrate, accompanied by a relatively low stiffness along a direction perpendicular to the surface of the substrate.

In a further preferred specific embodiment, the springs are formed in one piece with the seismic mass.

Advantageously, the seismic mass may be produced from polysilicon by semiconductor manufacturing processes.

In yet a further preferred specific embodiment, each of the springs exhibits a curvature.

Advantageously, it is possible to form springs with sufficiently low stiffness in one direction perpendicular to the surface of the substrate, without substantially increasing the dimensions of the acceleration sensor.

In still another preferred specific embodiment, in each case the springs are joined to the seismic mass via two projections.

In this manner, the maximum forces acting on the springs may advantageously be reduced at the connection to the seismic mass.

DETAILED DESCRIPTION

Figure 1:
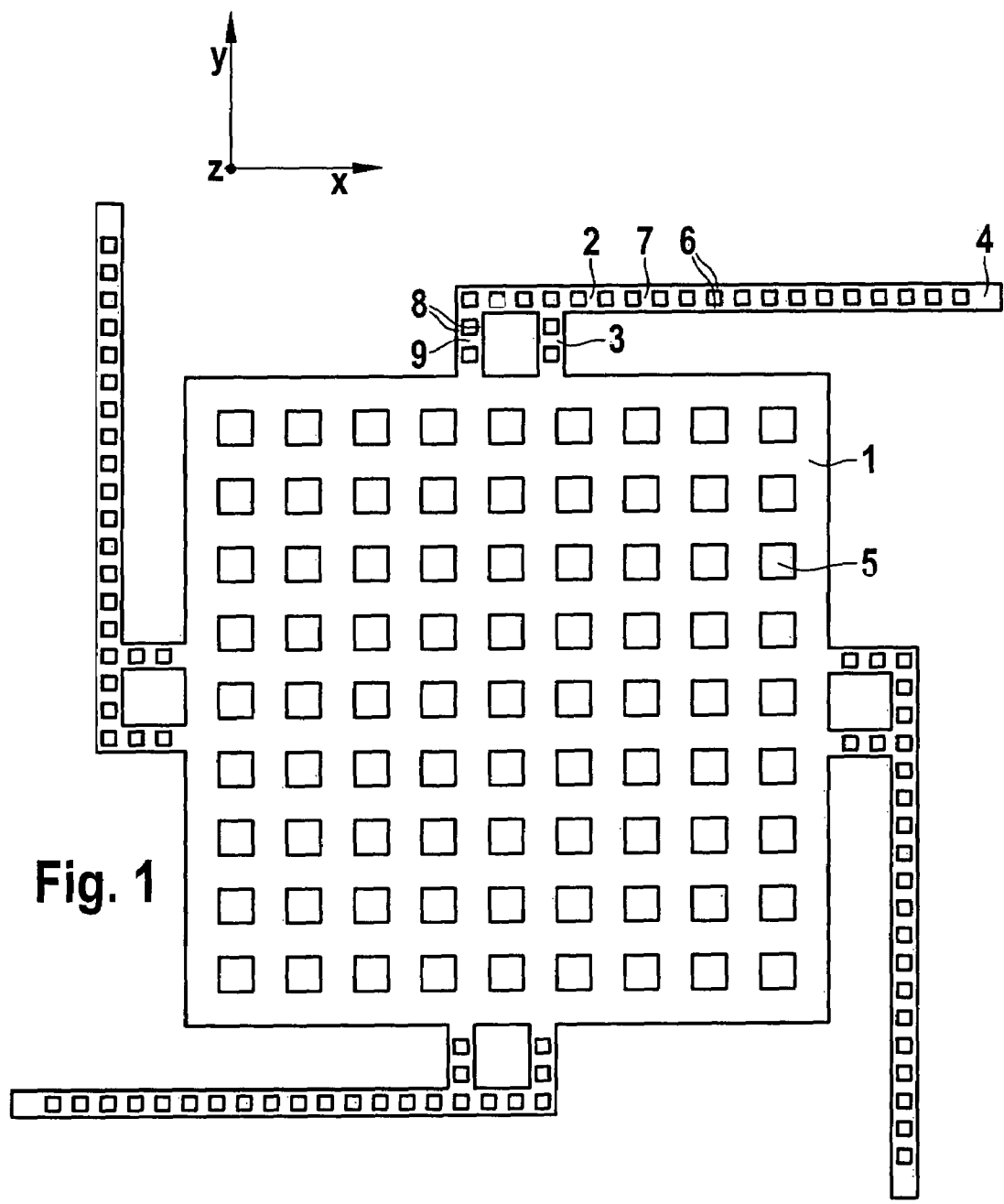
FIG. 1 shows a view of an acceleration sensor having springs that are not bent.

FIG. 1 shows a view of an acceleration sensor having springs 2 that are not bent. The acceleration sensor is made of a structure having a constant thickness, which is disposed above a substrate that runs in the plane of the paper. For example, the structure is produced by depositing a polysilicon layer with constant thickness on an oxide layer, that in turn is provided on a silicon substrate. Cavities are formed in the oxide layer, so that bonds from the polysilicon layer to the silicon substrate develop in these cavities. The structure is defined in the polysilicon layer by etching, and the oxide layer is removed in an etching process. In so doing, the polysilicon layer remains joined to the silicon substrate.

The structure includes a square seismic mass 1 and four springs 2 of the same kind, each of which is joined on one side of seismic mass 1 via, in each case, two projections 3 at one end to seismic mass 1. Instead of a square shape, other forms may also be used for the seismic mass. At their other ends 4, springs 2 are joined to the underlying substrate. Springs 2 are disposed parallel to the sides of seismic mass 1, to thereby make the acceleration sensor as compact as possible. Square holes 5 are formed in seismic mass 1, so that an etching agent is easily able to penetrate to the oxide layer during fabrication, and seismic mass 1 is completely released from the underlying substrate. Each spring 2 has two parallel bending bars 6 that are interconnected via crosspieces 7 and run at the same distance above the substrate. The two projections 3 are likewise formed as two parallel bending bars 8 interconnected by crosspieces 9. The number of springs is arbitrary. In any case, however, three springs must be provided in order to suppress oscillations along the substrate surface. For each spring, it is also possible to use more than two bending bars that are interconnected via crosspieces.

When seismic mass 1 is deflected in a z-direction perpendicular to the substrate because of an acceleration, the two parallel bending bars 6 of each spring 2 deform. Projections 3 also deform with bending bars 6. By connecting springs 2 to seismic mass 1 via two projections 3, which themselves are flexible, the maximally occurring force can be reduced at the connection of elastic springs 2 to rigid seismic mass 1, so that a rupture of springs 2 may be prevented. Below seismic mass 1, an electrode (not shown) is formed which detects a deflection of seismic mass 1 by measuring a change in capacitance with respect to seismic mass 1. In this context, oscillations of seismic mass 1 in the xy-plane invalidate these measurements and should therefore be suppressed. These oscillations are first of all suppressed by providing springs 2 on all four sides of square seismic mass 1. However, the amplitude of these oscillations and the natural frequencies of the spring-mass system made up of seismic mass 1 and springs 2 are also a function of the stiffness of springs 2 in the x-direction and y-direction, respectively.

In the further figures, the same reference numerals as in FIG. 1 are used for elements of the same kind, or only different elements are denoted by reference numerals.

Figure 2:
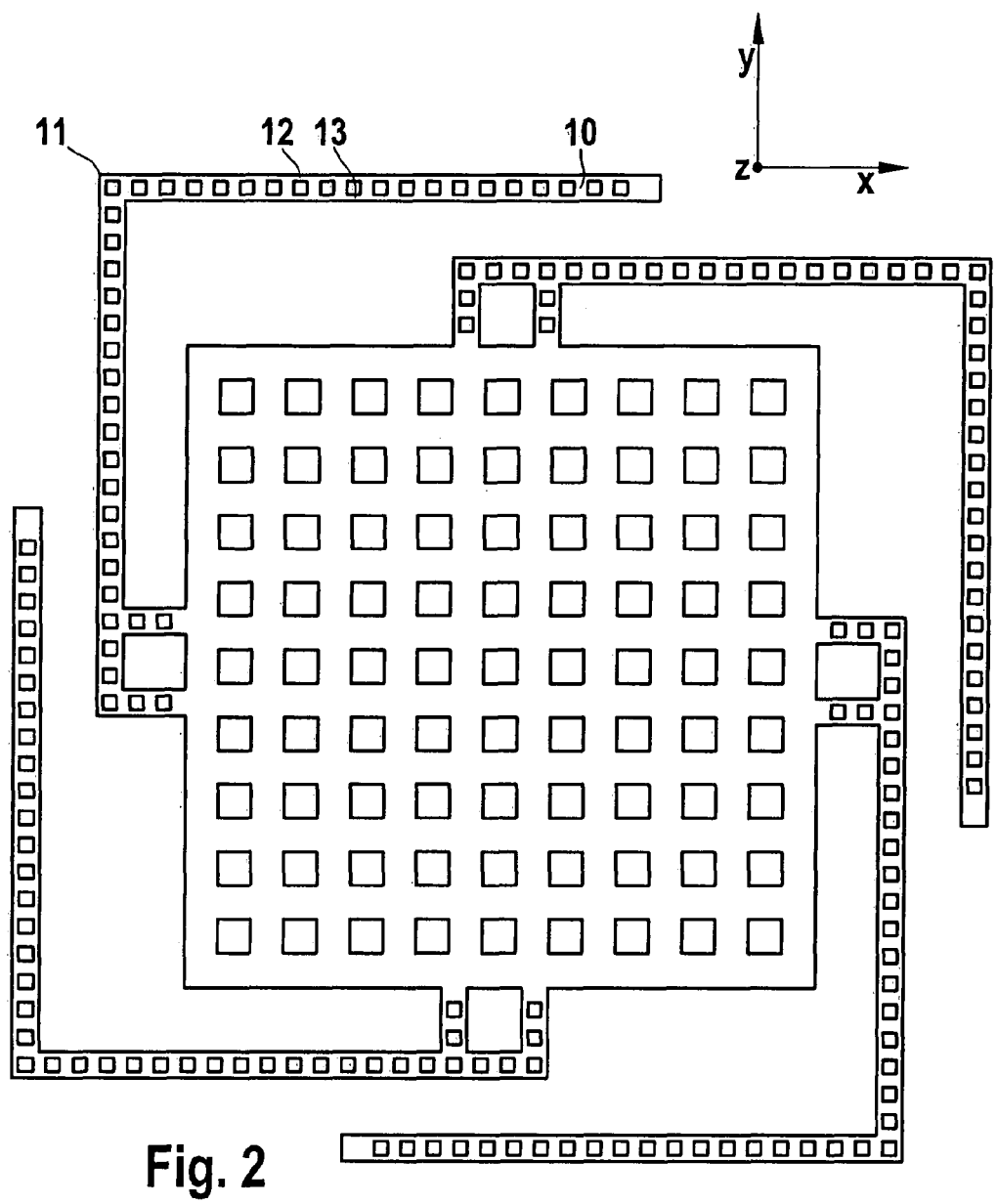
FIG. 2 shows a view of an acceleration sensor having springs that are bent once.

FIG. 2 shows a view of an acceleration sensor having springs 10 that are bent one time. The four springs 10 of the same kind have a bend 11, which is formed as a right angle of the two bending bars 12 and 13. A formation of the bend as a right angle is particularly space-saving for a square seismic mass 1.

Figure 3:
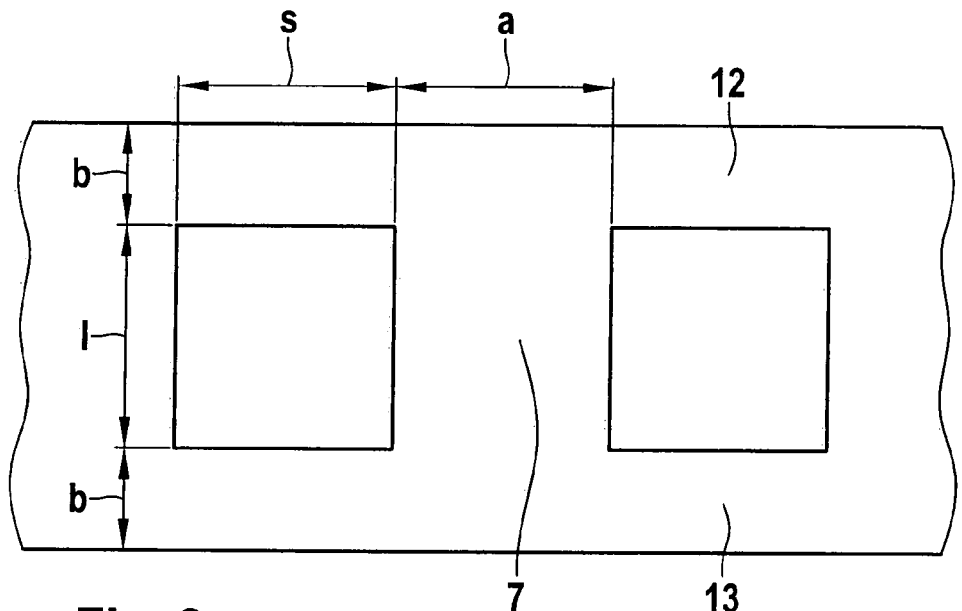
FIG. 3 shows a section of one of the springs from FIG. 2, bent once.

FIG. 3 shows a section of spring 11 from FIG. 2, bent one time. Parameter b denotes the width of a bending bar, parameter l denotes the crosspiece length, parameter a denotes the crosspiece width, and parameter s denotes the distance between two crosspieces. In FIG. 2, all parameters s, a, b and l are constant, but parameters s and a in particular can also vary. The two bending bars may also have a different width and their width can vary, so that l likewise can vary.

Figure 4:
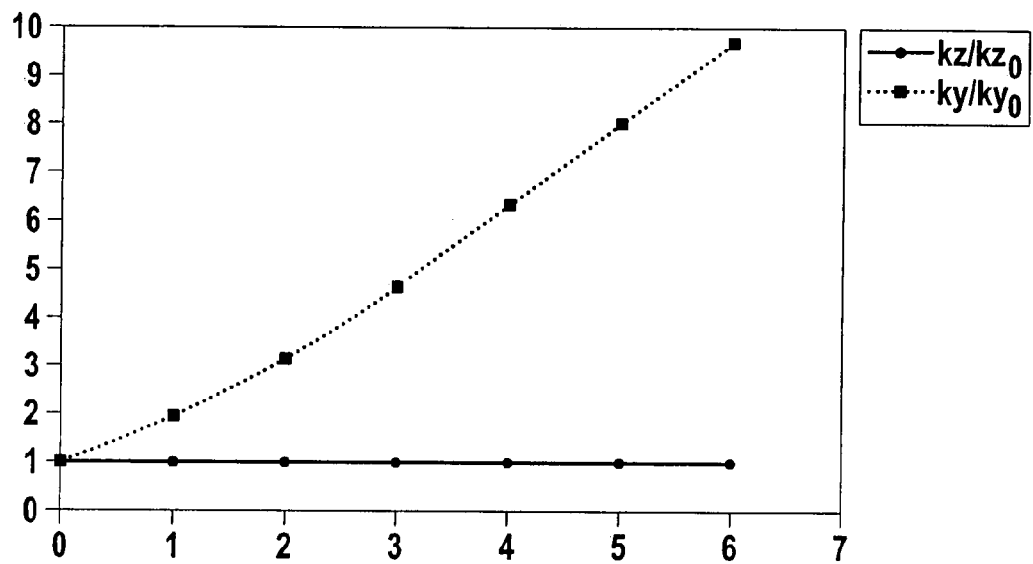
FIG. 4 shows a diagram of the stiffnesses of one of the springs from FIG. 2, bent once, as a function of a crosspiece length.

FIG. 4 shows a diagram of the relative stiffnesses of one of the springs, bent once, along the substrate surface in the y-direction ($ky/ky_0$) and perpendicular to the substrate surface in the z-direction ($kz/kz_0$) as a function of crosspiece length l which was calculated numerically by the finite element method, the further parameters s, a and b being constant. In this case, ky denotes the spring constant in the y-direction for an arbitrary crosspiece length, $ky_0$ denotes the spring constant in the y-direction for l=0, kz denotes the spring constant in the z-direction for an arbitrary crosspiece length, and $kz_0$ denotes the spring constant in the z-direction for l=0. The stiffness along the substrate surface increases as the crosspiece length increases, while the stiffness in the z-direction is independent of the crosspiece length. In this context, the spring for l=0 takes the form of an elongated flexible element, as is known from the related art. By using a suitable crosspiece length l, the stiffness of spring 10 along the substrate surface is able to be increased as desired, so that the amplitude of the oscillations of seismic mass 1 can be reduced to below a desired threshold value, and the natural frequencies of seismic mass 1 are able to be raised to the extent that they virtually cannot be excited.

Figure 5:
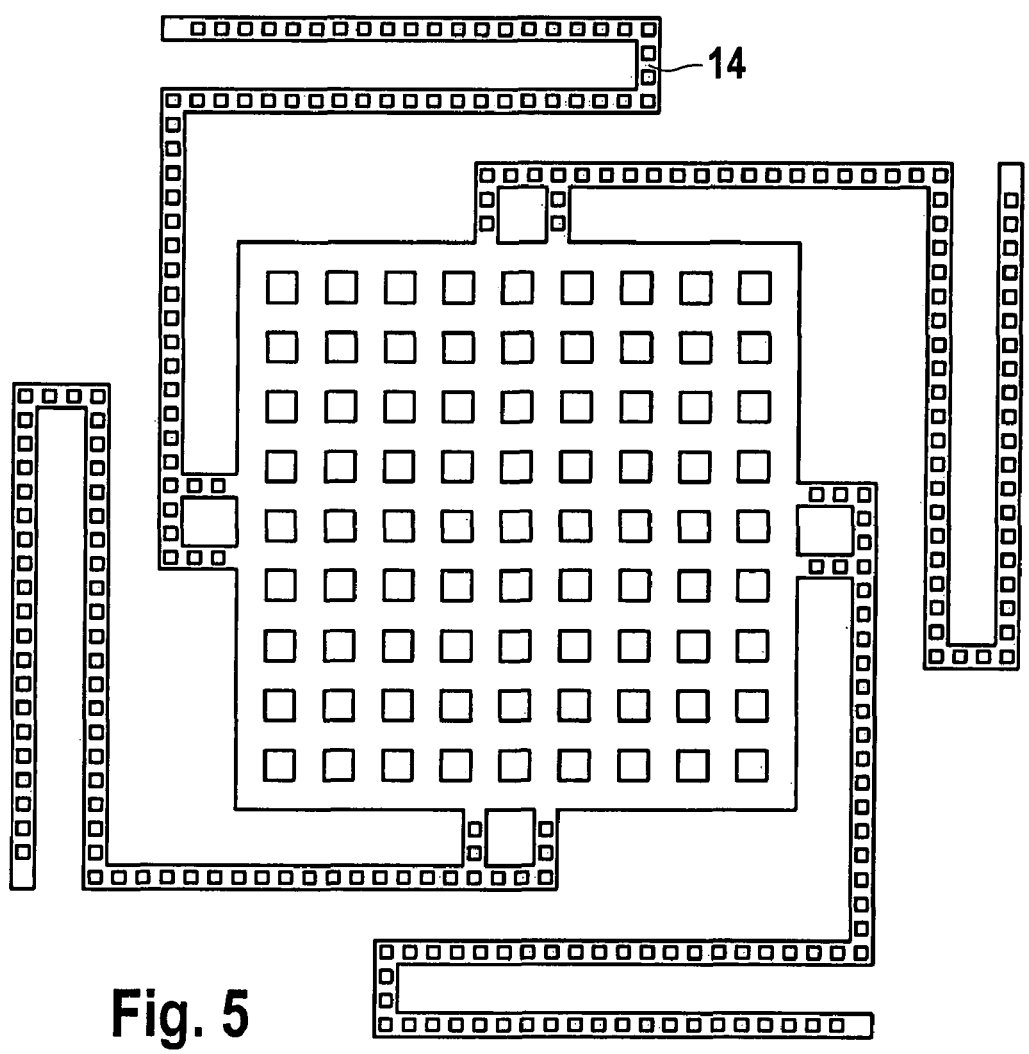
FIG. 5 shows a view of an acceleration sensor having springs bent three times.
Figure 6:
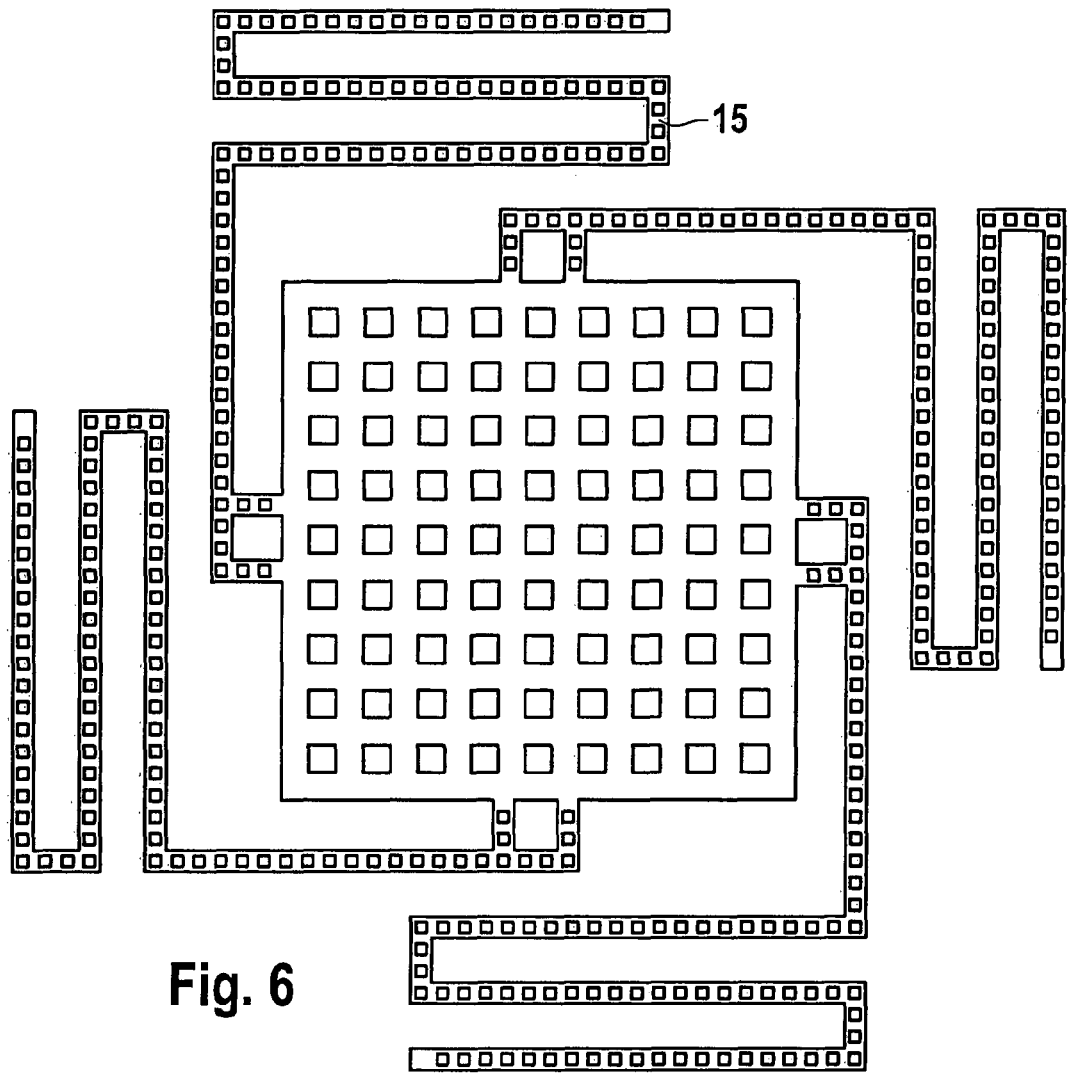
FIG. 6 shows a view of an acceleration sensor having springs bent five times.

FIG. 5 shows a view of an acceleration sensor having springs 14 bent three times (U springs), and FIG. 6 shows a view of an acceleration sensor having springs 15 bent five times (S springs). The number of bends is arbitrary.

What is claimed is:

1. An acceleration sensor, comprising:
   a substrate having a surface;
   a plurality of springs, each of the springs including at least two flexible bending bars that are interconnected via crosspieces; and
   a seismic mass suspended on the springs above the substrate, the seismic mass being deflectable in a direction perpendicular to the surface of the substrate.

2. The acceleration sensor according to claim 1, wherein each of the at least two flexible bending bars has a constant width.

3. The acceleration sensor according to claim 2, wherein the crosspieces have a constant length, so that the at least two flexible bending bars run parallel to each other.

4. The acceleration sensor according to claim 1, wherein the crosspieces are set apart uniformly between the at least two flexible bending bars.

5. The acceleration sensor according to claim 1, wherein the springs are formed in one piece with the seismic mass.

6. The acceleration sensor according to claim 1, wherein each of the springs has a bend.

7. The acceleration sensor according to claim 1, further comprising: two projections joining the springs to the seismic mass.

8. The acceleration sensor according to claim 1, wherein the at least two flexible bending bars deform when the seismic mass is deflected in the direction perpendicular to the substrate.

9. The acceleration sensor according to claim 1, wherein the seismic mass is a square shape.

10. The acceleration sensor according to claim 1, wherein an oscillation and a natural frequency of the springs is a function of stiffness of the springs.

11. The acceleration sensor according to claim 1, wherein each of the at least two flexible bending bars has a constant width, wherein the crosspieces have a constant length, so that the at least two flexible bending bars run parallel to each other, wherein the crosspieces are set apart uniformly between the at least two flexible bending bars.

12. The acceleration sensor according to claim 11, further comprising:
   two projections joining the springs to the seismic mass;
   wherein the springs are formed in one piece with the seismic mass, and wherein each of the springs has a bend, and
   wherein the at least two flexible bending bars deform when the seismic mass is deflected in the direction perpendicular to the substrate.

13. The acceleration sensor according to claim 12, wherein the seismic mass is a square shape, and wherein an oscillation and a natural frequency of the springs is a function of stiffness of the springs.

14. The acceleration sensor according to claim 11, wherein the seismic mass is a square shape, and wherein an oscillation and a natural frequency of the springs is a function of stiffness of the springs.

* * * * *